(No Model.)
J. HUNTER.
FENCE WIRE STRETCHER.
No. 415,640. Patented Nov. 19, 1889.
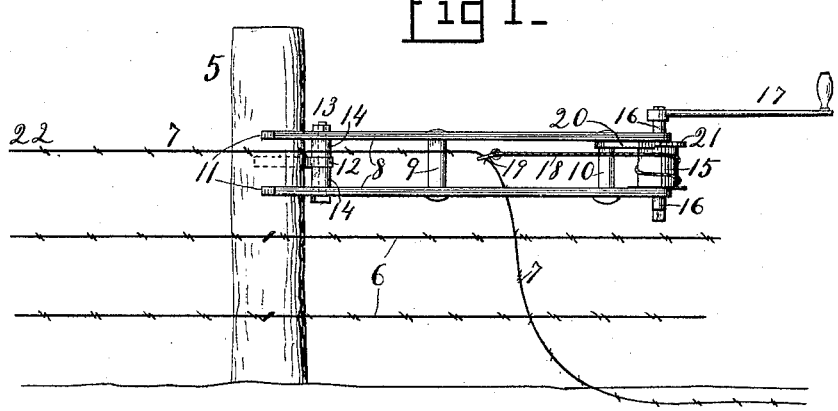
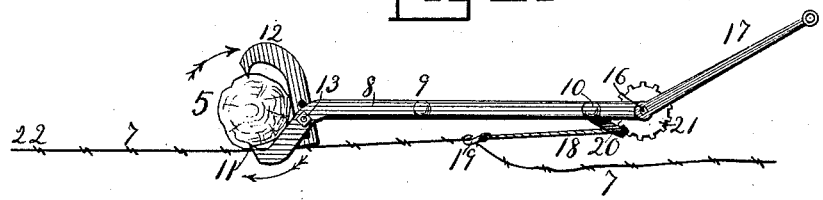
WITNESSES
S. E. E. Stevens
P. E. Stevens
INVENTOR
John Hunter.
W. X. Stevens.
Attorney
N. PETERS, Photo-Lithographer, Washington, D. C.

UNITED STATES PATENT OFFICE.

JOHN HUNTER, OF KINGSTON, ONTARIO, CANADA.

FENCE-WIRE STRETCHER.

SPECIFICATION forming part of Letters Patent No. 415,640, dated November 19, 1889.

Application filed September 3, 1889. Serial No. 322,889. (No model.)

*To all whom it may concern:*

Be it known that I, JOHN HUNTER, a citizen of Canada, residing at Kingston, in the county of Frontenac and Province of Ontario, Canada, have invented certain new and useful Improvements in Fence-Wire Stretchers; and I do hereby declare the following to be a full, clear, and exact description of the invention, such as will enable others skilled in the art to which it appertains to make and use the same.

This invention relates to fence-wire stretchers; and its object is to provide an implement which may be readily secured upon a standing fence-post, to hook upon a fence-wire which is attached to some other post, and to strain the wire in a suitable position to be fastened to the first-mentioned post.

To this end my invention consists in the construction and combination of parts forming a fence-wire stretcher, hereinafter described and claimed, reference being had to the accompanying drawings, in which—

Figure I represents a portion of a fence with my invention in side elevation, and Fig. II is a view looking down upon the same.

5 represents a fence-post, 6 some wires of the fence already stretched and secured to the post, and 7 the fence-wire which my invention is in the act of stretching.

8 represents the two side bars of the stretcher, each pointed at the rear end 11, and the two rigidly secured together as one piece by means of cross-bars 9 and 10.

12 represents a claw-hook pivoted to swing freely midway between the bars 8 on a bolt 13, which passes through the side bars 8.

14 represents two thick or long washers upon the bolt 13, to keep the hook 12 central.

15 is the cylinder of a winch journaled to revolve in bearings in the forward ends of the side bars 8, its shaft 16 being squared at both ends to receive a hand-crank 17 upon either end, as may be required in advancing to the right hand or left.

18 represents either a wire rope, a cord, or a chain secured at one end to the cylinder 15, to be wound thereon and provided at its other end with a grab-hook 19, adapted to get onto the wire and to hold to it at any point.

20 represents a pawl or detent pivoted to a stationary portion of the frame, (here shown as the cross-bar 10,) and adapted to engage with a ratchet-wheel 21, which is secured to the cylinder 15.

In operation one end of the wire is to be first secured to a post somewhere to the left of 22, then the stretcher is placed upon a post, with one side bar above and the other below the line of draft of the wire, and the grab-hook 19 is to be caught onto the wire and the crank 17 turned to wind up the cord 18. This has a tendency to turn the stretcher bodily around the post in the direction indicated by the arrows; but the points 11 of the side bars, inclining inward and to the rear, and the point of the hook, inclining inward and forward, are all forced into the post by such turning, and the points are soon buried so deeply as to hold the stretcher rigidly in place while at work, and yet, after the wire has been made fast to the post and the grab-hook 19 freed therefrom, the stretcher may be easily turned in the opposite direction to the arrows and set free from the post.

This wire-stretcher is simple, light, thoroughly effective, and easily operated.

Having thus fully described my invention, what I believe to be new, and desire to secure by Letters Patent, is the following:

The combination of the two side bars 8, rigidly secured together and provided with the points 11, inclined inward and rearward, the cylinder 15, journaled in the forward ends of the said side bars and having a shaft squared at both ends, and further provided with a ratchet-wheel 21 and a crank 17, the cord or chain 18, secured at one end upon the cylinder and provided with a grab-hook 19 at the other end, and the claw-hook 12, freely hung midway between the said side bars and having its point slanted inward and forward, substantially as shown and described.

In testimony whereof I affix my signature in presence of two witnesses.

JOHN HUNTER.

Witnesses:
J. T. MCMAHON,
G. S. HOBART.